Sept. 11, 1956    M. A. RUDNER    2,762,116
METHOD OF MAKING METAL-SURFACED BODIES
Filed Aug. 3, 1951

INVENTOR.
Merritt A. Rudner
BY Julius E. Foster

United States Patent Office 2,762,116
Patented Sept. 11, 1956

2,762,116

METHOD OF MAKING METAL-SURFACED BODIES

Merritt A. Rudner, Camden, N. J., assignor to United States Gasket Company, Camden, N. J., a corporation of New Jersey Application August 3, 1951, Serial No. 240,146

3 Claims. (Cl. 29—472.9)

This invention relates to metal-surfaced plastic products.

This invention is directed primarily to a method of making a product, which will permit the utilization of various plastic materials, because of their excellent electrical insulating qualities, to serve respectively as a base for a metallic conducting sheet or strip that may be used in an electrical circuit assembly or system as a conductor, or that may be used as an electrical terminal, or that may be otherwise used in various ways for its physical qualities.

The excellent insulating qualities of many plastics have made them desirable for use as a base for a metallic surface for electrical applications. However, some inability in utilizing the plastic material for that purpose has arisen from the difficulty in establishing a cohesive bond between the base material and the metal strip which it was desired to secure to that base material.

Among the plastic materials that have good insulating qualities, there are some that also have other qualities that make them particularly desirable for use as a base for metallic surface, for use in electrical or electronic applications. Among those materials that are so particularly desirable, are the fluoro-carbon resins.

Two fluoro-carbon resins are presently commercially available that have chemical, physical and electrical characteristics, which make them suitable materials for many applications. One of those materials, polytetrafluoroethylene, is made and sold under the trademark Teflon; and the other is polymonochlorotrifluoroethylene, sold under the trademark Kel-F.

For convenience, the trademark will be referred to to indicate the materials, and, to avoid unnecessary repetition, the single trademark Teflon will be employed, with the understanding that both materials are included in the reference, where the nature of the context, either in the specification or in the claims, is such as to refer equally well to either material.

One of the striking physical characteristics of Teflon is its ability to resist wetting and sticking. It is therefore impervious to water and moisture. The resistivity of these materials is very high. The power factor is low. Those characteristics combine to make these materials excellent base materials for electronic applications.

These materials are provided in their raw state as powders, which may be formed and molded by pressure and heat to any simple shapes that may be desired. The materials may also be formed in bar or sheet stock and then machined to shape, where complex shapes are desired that may not be readily adapted to simple molding or extruding operations, for example.

Because of the non-sticking surface characteristic of Teflon, it has been considered very difficult, and almost impossible, to establish a direct physical bond between a Teflon body and any external metal element, either to support the Teflon or to utilize the Teflon as a supporting body for the external metal element.

Because of the non-surface sticking characteristic of Teflon, it has been considered very difficult, and almost impossible, to provide a direct physical bond between the Teflon body and any external metal element, either to support the Teflon or to utilize the Teflon as a supporting body for the external metal element. Teflon has an additional characteristic that makes it particularly desirable for use in the electrical and electronic industries. After having been formed into a desired shape, it will withstand operation at a higher ambient operating temperature than will most other presently known plastic materials.

The excellence and desirability of that temperature-resistant characteristic of Teflon in use, merely aggravates the problem of forming a cohesive bond between the Teflon and a sheet of surface metal. Operation of the Teflon body at such elevated temperatures implies thermal operating cycles of greater amplitude, in successive heating and cooling, with correspondingly greater stresses between the Teflon as a base and the metal layer that is to be secured thereto. Where cyclic operation is likely to be involved with corresponding heating and cooling, the successive stresses in alternately reversing directions will tend to strip a metal layer from the base material, unless the bond between the metal layer and the base material is strong and cohesive.

An object of this invention is to provide a product, as an article of manufacture, or as a finished material from which an article of manufacture may be made, consisting generally of a plastic base, and specifically of a base of Teflon material, to which a layer of metal has been strongly and cohesively bonded, so that the finished body consisting of the plastic, or of the Teflon, with the metal surface may be a finished unit, to desired size and shape, or so it may be readily machined in various ways to form parts and articles of desired dimensions.

Ordinarily, a metal sheet or strip that would be used for surfacing an insulator body, or a body of insulating material of the kind considered here, would be relatively thin, of the order of 0.002 to 0.003 inch thick. Any such metal that is commercially available is extremely smooth, and does not provide a structure by means of which a strong and cohesive bond may be established between such thin sheet or strip metal and a base material of Teflon for example.

An object of the present invention is to condition the under surface of a thin layer of sheet or strip metal which is to be used as the surfacing layer for an insulating base, so that the under surface will tend to receive and grip, or key, portions of the base material when the sheet or strip material is pressed onto a surface of the base material, and upon solidifying the base material will be firmly held by the under surface of the sheet metal.

In accordance with the principles of this invention, the under surface of the sheet or strip of metal is covered with small particles of random sizes and shapes of the same or of other metal, and those particles are permanently secured to that under surface of the sheet or strip metal, by welding, by metal spray, by globulizing, or other process which will cause the particles, after they are thus deposited and secured, to constitute under-cut posts secured and anchored to the under surface of that sheet or strip of metal, and to present a myriad of re-entrant angles to receive the compressed Teflon powder, or the like.

When the layer of metal has been thus treated it may then be covered on its under surface with some of the material to which it is to be secured. It is then placed on the body of the material to which it is to be joined, all of which is then subjected to pressure to cause the plastic base material to flow into the re-entrant angles as under cut regions of those particles, which then serve as keys or anchors to hold the layer of metal firmly joined to the base material. The body is then heated, or pressed and heated, according to its nature, to be thermo-set.

When Teflon is used as the base for the purpose herein contemplated, it may be used in its powder form throughout the entire thickness of the base, or, in another modification, the Teflon may be used to condition sheets of fabric, which may then be combined under pressure, and then sintered in the usual way, for treating Teflon. In that case the fabric utilized for that purpose is preferably of fibre-glass, but it may be made of any other suitable material that will withstand the sintering temperature.

The fibre-glass fabric used for this purpose is of the order of a quarter-mil in thickness and is treated by dipping in a Teflon suspensoid, and then dried, to form a fabric about two to three mils in thickness. Sufficient layers of treated fabric are stacked to provide the desired thickness required before compression. The layer of treated copper sheet is then also preferably dipped in the Teflon suspensoid, and applied to cover the pile of treated fabric sections. The entire pile is then compressed to desired thickness, and is then sintered at the usual sintering temperature for the Teflon, which is about 700 degrees Fahrenheit.

In the case of other base materials, the fabric may be similarly treated and the combined body structure with the layer of metal superposed, may then be treated by the procedure required and customarily employed to shape and heat the material to establish the thermo-setting action.

The manner in which the procedure is employed, and the features of such construction may be more readily seen, upon reference to the accompanying description and drawings, in which—

Figure 1:
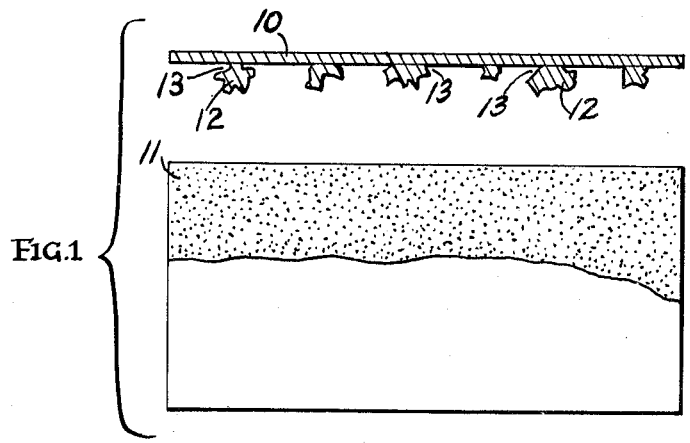
Figure 1 is a side view of a sheet of thin metal with its under surface conditioned, and about to be superposed on a body of plastic material, shown by way of example, as a Teflon type of material.

As shown in Figure 1 of the drawings, a thin sheet of metal 10 is to be secured to a body of thermo-plastic material 11, shown in powder form, which for the purpose of illustration herein may be taken to be raw powder Teflon. In order that the metal 10 in the form of sheet or strip, may be securely bonded to the thermo-plastic material, or Teflon, as a base, the sheet metal used for this purpose is ordinarily fairly thin rolled stock, being of the order of 0.002 to 0.003 inch in thickness. Thin metal that is available in this thickness commercially is very smooth on both sides, and with metal of such smoothness it is possible to make only a superficial bond between it and the body of plastic material 11.

In the raw state, the plastic material 11 is shown consisting of a fine powder which may be distributed in desired form and thickness within a suitable restricting container or mold, and then pressed to the desired shape and size. In the present illustration Teflon is considered as the base material, and it is therefore so illustrated, as being of powder material in its raw state.

Where the metal is to be used for its conductivity for electrical or electronic applications, copper could ordinarily be used. For illustration, copper will be referred to as the metal employed, although it should be understood that any other metal which may be formed in thin sheet and treated as hereinafter described, may be equally well employed.

In order that the copper sheet or strip 10 may be securely bonded to the Teflon or other plastic material as a base, the copper sheet 10 is first conditioned by being provided with a large number of small particles 12 on the under surface of the sheet 10. Those particles may be of random size and shapes consisting of small broken pieces of metal, such as copper, which are distributed at random in spaced relation in one layer, on the under surface of sheet 10, and are then secured to the copper sheet by any suitable method, such as by heating, or soldering, or welding, or any other process that will serve to bond those particles 12 permanently to the sheet of copper 10. The random shape of the particles 12 provides a large number of re-entrant angles and concavities 13 between the outer edges of the particles and the inner original surface of the copper sheet 10, into which portions of the plastic base material may be received when the copper sheet and the base material are pressed together.

After the particles are bonded to the metal sheet, the entire sheet is preferably dipped into a Teflon supensoid, and then withdrawn and dried, to form a thin layer of Teflon on the metal under surface and the particles. This dipping treatment provides a preliminary filling of the re-entrant angles and crevices under the particles.

The copper sheet is then laid on the Teflon powder body and the assembly compressed, according to usual procedure, to desired thickness. The particles thus enter the base material somewhat like roots, and, since the material is pressed up and around the re-entrant regions of the particles, a relatively strong bond will be formed between those particles and the base material when the base material is thermo-treated and solidified. The various particles then serve as anchored roots or keys that are held tightly by the base material and an exceptionally strong bond is thus formed between the copper sheet and the base.

Moreover, during the initial pressure, which may be of the order of 20,000 to 40,000 pounds per square inch, and the subsequent sintering at 700 degrees Fahrenheit, all air is squeezed out from between the copper sheet and the Teflon body.

Figure 2:
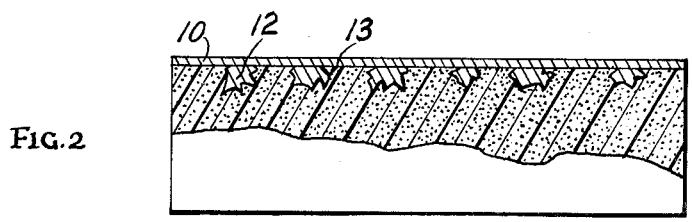
Figure 2 is a similar view, after the metal sheet has been compressed with the body of powder to size and thickness desired, with the powder pressed into the re-entrant angles or crevices between the under surface of the metal sheet and the metallic particles secured thereto, before sintering or equivalent thermoplastic setting and hardening.

After the copper sheet is laid on top of the powdered material 11 the entire assembly is compressed to the desired thickness. In the case of Teflon, the initial volume is ordinarily about four times the volume of the finally compressed article, which provides a guide for the quantity of Teflon powder to be used in determining the initial quantity as shown in Figure 1. When the entire body of material including the sheet metal is compressed to the size desired, as generally represented in Figure 2, for example, the Teflon material and the metal sheet form an integral unit that is self-sustaining and may be readily handled, without external support for the material. The compressed unit is then subjected to the sintering temperature in a suitable furnace at a temperature of about 700 degrees Fahrenheit for an interval of time that depends upon the thickness of the material and its volume, in order that the entire body may be elevated to that temperature for the time required to treat Teflon. In the case of other materials that may be utilized as a base, the heating interval and the heating temperature would be that usually employed and specified for that material.

Figure 3:
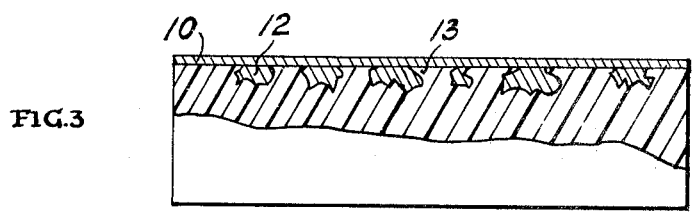
Figure 3 is a view similar to that in Figure 2, after the thermo-setting operation.

After the assembled unit is sintered, or otherwise thermoset after a heating treatment, the finished unit has a structure as in Figure 3, which is similar to Figure 2 except that it indicates that the body material has already taken a permanent set and has formed the rigid gripping finger structures at and around the re-entrant portions of each of the various particles 12 on the under surface of the copper sheet 10.

The finished unit as shown in Figure 3 has a rigid and strong body structure 11 of insulating material, indicated as Teflon, for example, and a metallic copper surface 10 which may then be utilized for its various mechanical properties as a metal, or for its electrical conductivity in electrical and electronic applications, by serving as a metallic conductor to which electrical connection may be suitably made by tinning the surface of the copper sheet so it may easily and readily receive a soldered terminal connection.

In similar manner, the metallic surface 10 may be utilized for connection to other metallic surfaces, or to form supports or hermetic sealing connections, or for myraids of applications in which metal-to-metal connections are utilized in industry and science.

Figure 4:
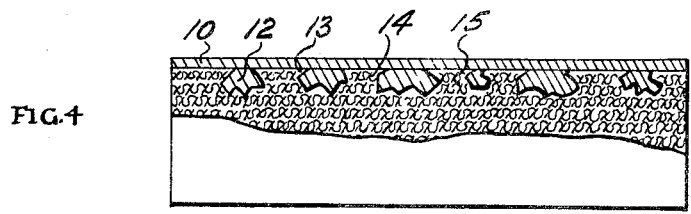
Figure 4 is a similar view of a body formed from a pile of fabric sheets pre-treated with the plastic material and then compressed and thermo-set.

In Fig. 4 is shown a second modification, in which a fabric material, such as fibre-glass, is first treated by the plastic material that is to be used as a base. In the case where the plastic material is Teflon, for example, the fibre-glass is first dipped into a suspensoid of the Teflon in order to accept and hold a layer of the Teflon, and after the fabric is dried the Teflon adheres thereto sufficiently for the present purpose. A plurality of layers of fabric that have been thus treated are then piled to a depth which after compression will provide the desired thickness.

The top of the layer is then covered by a sheet of metal, similar to that shown in Figure 1, which has been formed to embody the particles 12 on its under surface as integral elements of the sheet of metal. That sheet of metal is then dipped in a suspensoid of the Teflon, for example, and is then compressed on top of the layers of the treated fabric in such manner that the metal particles 12 will cut thru the corresponding upper layers of the treated fabric of fibre-glass. The rough edges of the fabric material enter into the re-entrant angles and crevices around each of the particles and provide re-inforcement to the plastic in those regions. Upon heating of the entire fabric unit with the metal surfacing sheet in place, the body becomes hardened and sets, and the edges of the fabric and the plastic that surround each of the metallic particles thereby form a hard rigid binding and gripping ring around each of the under particles 12 of the metallic surface, with the metallic surface layer 10 constituting an integral surface of the body, bonded to the body of material in such manner as to be able to withstand recurring temperature cycles, without stripping away from the plastic body.

The invention is illustrated and described in its application to plastic materials of the powder type, and specifically to Teflon, but it is not so limited since it may be utilized in connection with plastic materials of any kind in which the sheet metal particles may be immersed before a thermo-setting operation is performed to harden the plastic material that is employed.

What is claimed is:

1. The method of forming a metal-surfaced fluorcarbon resin member, which consists in treating sheets or strips of fabric of fibre-glass in a suspensoid of the resin, drying the sheets or strips to retain a thin surfacing of the resin, assembling and stacking the treated fabric sheets or strips to an initial thickness to assure a final desired thickness after compression, superposing on the stack of fabric sections a layer sheet or strip of thin metal having random shaped metal particles distributed over the under surface of the metal and integrally bonded thereto, then compressing the entire assembly to a firm dense coherent mass, with the particles on the under surface of the metal layer pressed into and through several layers of fabric and with the fabric torn edges pressed to grip the particles, and then sintering the compressed mass to a temperature of 700 degrees Fahrenheit.

2. The method of claim 1, including the step of dipping the metal sheet or strip in a suspensoid of the resin prior to superposing it on the stack of treated fabric sections.

3. The method of making a metal-surfaced fluorocarbon resin product, by adding a metal strip to a body of said resin powder, which consists in disposing a quantity of said resin powder in a mold to be compressed, conditioning a metal surfacing strip by causing its under surface to be roughened, with a large number of irregularities presenting open concave regions and re-entrant angles immediately adjacent the original untreated under surface of the metal strip and able to receive a filling of said resin particles, dipping the roughened strip in a suspensoid of said resin to fill the concave regions and re-entrant angles and to form a layer of said resin generally over the irregular under surface of the metal strip, placing the strip on the quantity of said resin powder with the under surface of the strip in engagement with the Teflon powder, then compressing the assembly of powder and metal strip to a dense volume as a coherent unit, and then sintering the compressed unit to normal sintering operation for the resin.

References Cited in the file of this patent

UNITED STATES PATENTS

| | | |
|---|---|---|
| 798,413 | Howard | Aug. 29, 1905 |
| 1,412,326 | Williams | Apr. 11, 1922 |
| 1,807,875 | Robinson | June 2, 1931 |
| 1,844,512 | Mains | Feb. 9, 1932 |
| 2,052,585 | Tannewitz | Sept. 1, 1936 |
| 2,049,878 | Stresino | Aug. 4, 1938 |
| 2,274,189 | Congleton | Feb. 24, 1942 |
| 2,317,963 | Bashore | Apr. 27, 1943 |
| 2,355,949 | Boutwell | Aug. 15, 1944 |
| 2,400,099 | Brubaker | May 14, 1946 |
| 2,407,145 | Elwin | Sept. 3, 1946 |
| 2,423,922 | Arndt | July 15, 1947 |
| 2,432,752 | Gray | Dec. 16, 1947 |
| 2,456,262 | Fields | Dec. 14, 1948 |
| 2,484,484 | Berry | Oct. 11, 1949 |
| 2,535,030 | Balsbaugh | Dec. 26, 1950 |
| 2,557,372 | Cerulli | June 19, 1951 |
| 2,561,449 | Ruderman | July 24, 1951 |
| 2,600,220 | Doelker | June 10, 1952 |